Oct. 8, 1968
C. E. HORNE
3,404,926
FULL COMPLEMENT BEARING ASSEMBLY
Filed March 1, 1966
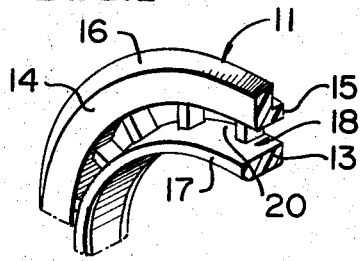
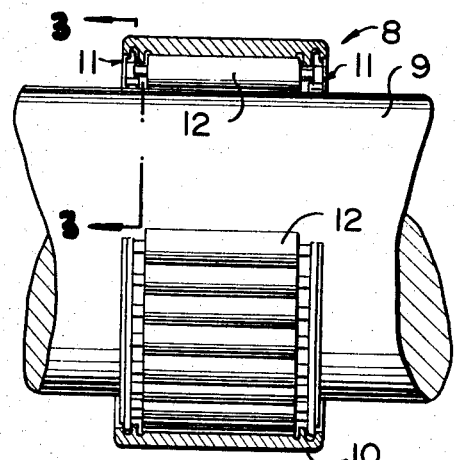
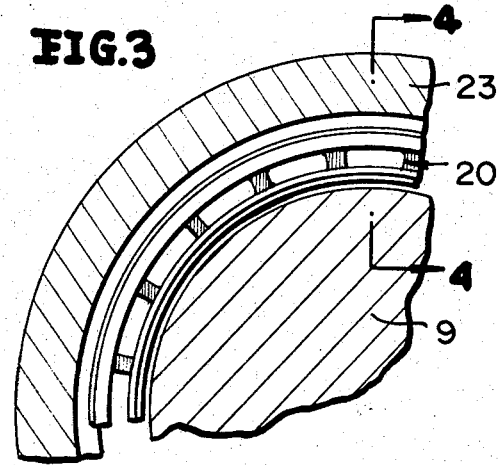
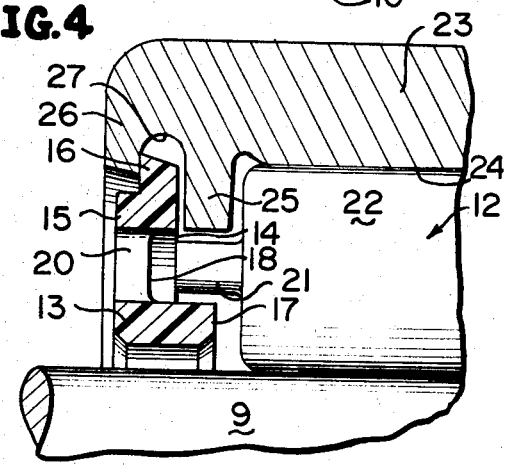
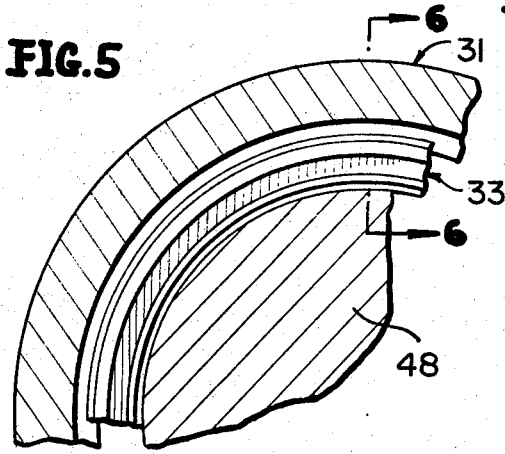
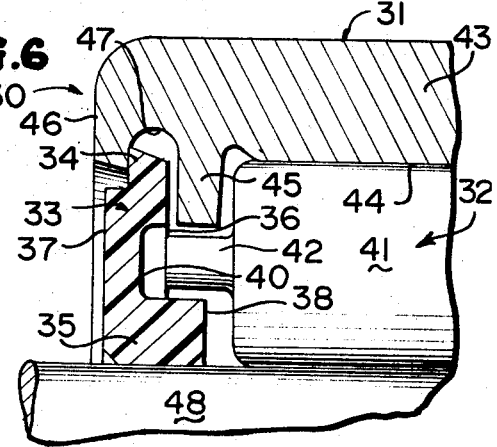
INVENTOR
CHARLES E. HORNE
BY
Mason, Porter, Diller & Brown
ATTORNEYS United States Patent Office 3,404,926
Patented Oct. 8, 1968

3,404,926
FULL COMPLEMENT BEARING ASSEMBLY
Charles E. Horne, Torrington, Conn., assignor to The Torrington Company, Torrington, Conn., a corporation of Maine
Filed Mar. 1, 1966, Ser. No. 530,872
12 Claims. (Cl. 308—213)

ABSTRACT OF THE DISCLOSURE

A retaining washer for a bearing assembly is provided, the washer being adapted to engage a trunnion end of rollers, for retaining the rollers adjacent a bearing cup race surface. The washer includes an axially inwardly extending lip for engaging the trunnions, and has a radially outwardly extending annular flange which is engaged between radially inwardly extending cup lips, and is confined between both lips. An annular clearance slot is provided for the trunnion ends, and lubrication slots of arcuate configuration may be provided, extending through the washer. The washer, being constructed as an annulus, is a complete ring, and has at its radial outermost surfaces a frusto-conical configuration which cooperates with a complementally configured surface on an axial outermost one of the radially inwardly extending cup lips, for facilitating positioning of the washer. The inner diameter of the washer may provide clearance for shaft rotation, or may be sized for press-fit engagement with a shaft, in the latter case the washer flange being rotatable within the radially inwardly extending cup lips.

---

This application relates in general to new and useful improvements in the roller bearing art, and more particularly relates to full complement roller bearing assemblies having retainers at opposite ends thereof for retaining rollers in position adjacent an associated bearing race prior to the placing of the bearing assembly about a shaft.

Accordingly, it is a primary object of this invention to provide retaining washers at opposite ends of a bearing assembly for engaging trunnions at respective ends of the associated bearing rollers, the washers being operative to retain the bearing rollers adjacent the bearing race during the positioning and removal of the bearing assembly about the shaft.

It is another object of this invention to provide washers at opposite ends of a bearing assembly for engaging trunnions of associated bearing rollers which retain the bearing rollers adjacent the race of a bearing cup to facilitate positioning and removal of the bearing assembly about a shaft, but which do not perform an operative function once the assembly is applied to a shaft.

It is still another object of this invention to provide retaining washers at opposite ends of a bearing assembly for retaining trunnions of associated bearing rollers adjacent the bearing race during positioning and removal of the bearing assembly about a shaft, the retaining washers being operative to provide end seals for the bearing assembly when applied to the shaft.

It is a further object of this invention to provide a novel bearing assembly having a bearing cup with cooperating annular flanges at each end thereof defining an annular groove therebetween adapted to confine an associated retaining washer therein for retaining trunnions of associated bearing rollers adjacent the bearing race during positioning and removal of the bearing assembly about a shaft, the innermost of the annular flanges at each end of the bearing assembly providing an abutment edge to take up bearing end thrusts.

With the above and other objects in view that will hereinafter appear, the nature of the invention will be more clearly understood by reference to the following description the appended claims and the several views illustrated in the accompanying drawings.

In the drawing:

FIGURE 1 is a longitudinal view, partially in elevation and partially in section, with portions broken away for clarity and illustrates the bearing assembly of this invention positioned on a shaft.

FIGURE 2 is an enlarged fragmentary perspective view of a retaining washer of this invention and illustrates the relationship of a retainer annular flange, an axially extending retainer lip, the annular channel, and a plurality of slots in communication with the channel.

FIGURE 3 is an enlarged fragmentary vertical sectional view of the assembly of FIGURE 1, taken along the line 3—3 of FIGURE 1, with the retaining washer or retainer being shown in elevation, and illustrates the normal operating clearance of the retainer with respect to a shaft.

FIGURE 4 is an enlarged fragmentary vertical sectional view of the bearing assembly of this invention, taken along the line 4—4 of FIGURE 3, and illustrates the retainer flange in confined relation between a pair of annular flanges of the bearing cup at one end of the bearing assembly.

FIGURE 5 is an enlarged fragmentary vertical sectional view of another bearing assembly of this invention, taken along a line similar to line 3—3 of FIGURE 1, and illustrates an alternative retaining washer of this invention in press-fit engagement with a cooperating shaft.

FIGURE 6 is an enlarged fragmentary sectional view of the bearing assembly of this invention, taken along the line 6—6 of FIGURE 5, and illustrates the retaining washer functioning as a bearing end seal and a radial flange of the retaining washer being in confined relationship between cooperating adjacent annular flanges at one end of the bearing assembly.

Referring now to the drawing in detail, there is shown in FIGURE 1 a bearing assembly generally designated by the numeral 8, in operative engagement with a shaft 9. The bearing assembly 8 includes a bearing cup or shell 10, a pair of identical retaining washers 11, and a full complement of bearing rollers 12.

Each retaining washer or retainer 11 comprises a circumferential annulus including a radial innermost portion 13, inner and outer axially spaced surfaces 14 and 15, respectively, an outer peripheral radial flange 16, an axially directed annular lip 17, an annular channel 18 in the inner surface 14 positioned radially outwardly of and adjacent the annular lip 17, and a plurality of spaced arcuate slots 20 extending between the inner axially spaced surface 14 and the outer axially spaced surface 15. The arcuate slots 20 are axially aligned with and in communicating relation with the channel 18. The retaining washer 11 is preferably of a plastic construction and is therefore inherently resiliently deformable, although each washer may be constructed of metal if resiliency is not desired.

The bearing rollers 12 are preferably of the needle-bearing type, and have reduced diameter portions at the ends thereof forming trunnions 21 aligned with a main body portion 22 of the rollers 12.

The bearing cup or shell 10 includes a cylindrical body portion 23 having an inner race surface 24, axially spaced inner and outer radially inwardly extending annular flanges 25 and 26, respectively, at each end thereof, and an annular groove 27 at each end of the bearing cup between adjacent inner and outer annular flanges. Each axial innermost annular flange 25 extends generally radially inwardly a greater distance than each outer annular flange 26.

In the assembled condition of the bearing assembly of this invention, a full complement of bearing rollers 12 is positioned against the race 24 of the bearing cup 10 with opposite ends (unnumbered) of the bearing rollers 12 adapted to transmit axial thrusts from the main body portions 22 of the rollers 12 to adjacent inner annular flange 25 of the bearing cup 10. The trunnions 21 at each end of the bearing rollers 12 extend past the inner annular flanges 25 and are each adapted to be confined radially between an inner annular flange 25 and an associated axially directed annular lip 17 of the retaining washer 11. The retaining washer 11 is resiliently deformed and sprung into a confined position within the annular groove 27 between the inner and outer annular flanges 25 and 26 of the bearing cup 10. The radial innermost portion 13 of the retaining washer 11 has an internal diameter (unnumbered) selected for running clearance with an associated shaft 9. End clearance for each trunnions 21 is provided by an associated annular channel 18 of the retaining washer 11. The arcuate slots 20 provide ready access for inserting a lubricant inwardly of the retaining washers 11 for the bearing rollers 12.

FIGURES 5 and 6 illustrate a modified bearing assembly 30 of this invention, including a bearing cup 31, a full complement of bearing rollers 32, and a modified retaining washer 33.

The retaining washer 33 includes an outer peripheral radial flange 34, a radial innermost portion 35, inner and outer axial surfaces 36 and 37 respectively, an axially directed annular lip 38, and an annular channel 40 disposed in the inner axial surface 36 radially outwardly of the annular lip 38.

The bearing rollers 32 each include a body portion 41 and trunnions 42 at opposite ends thereof, similar to the rollers of the assembly of FIGURE 4.

The bearing cup 31 includes a body portion 43 having an inner race surface 44 and depending radially inwardly extending inner and outer annular flanges 45 and 46 respectively, defining an annular groove 47 therebetween at each axial end of the bearing cup.

Each of the trunnions 42 is adapted to be engaged by an adjacent axially directed annular lip 38 of the retaining washer 33, thereby retaining the bearing rollers 32 adjacent the race 44 of the bearing cup 31. Each of the retaining washers 33 is confined between associated inner and outer annular flanges 45 and 46, respectively, by the outer peripheral radial flange 34 of the retaining washer 33, inserted within the annular channel 47 of the bearing cup 31. The radial innermost portion 35 of the retaining washer 33 is press-fit onto a shaft 48, for rotation therewith. The outer peripheral radial flange 34 of the retaining washer 33 is confined within the annular groove 47 of the bearing cup 31 for running clearance therewith, whereby the retaining washer 33 functions as a bearing end seal.

Although only preferred embodiments of the invention have been described and illustrated herein, it is to be understood that minor modifications may be made in the bearing and in its application within the spirit and scope of the invention, as defined in the appended claims.

I claim:

1. In a full complement roller bearing assembly, a bearing cup and a retaining washer; said washer comprising a resilient annulus having an outer peripheral radial flange engaged by said bearing cup and axially directed annular lip means extending inwardly of said bearing cup from a radial inner portion of said washer adapted to confine roller trunnions and retain rollers in a radially outward position substantially adjacent a bearing race; said cup including means for confining said washer flange in loosely held-captive relation; said retaining washer being unbroken along its circumferential extent to define a closed, continuous washer of resiliently deformable material allowing deformation thereof upon application to said bearing cup and said axially directed annular lip means providing roller supporting means for exclusively limiting inward radial roller movement prior to mounting of said assembly for use and to prevent disassembly thereof.

2. The bearing assembly of claim 1, wherein said means for confining said washer flange includes axially spaced inner and outer radially inwardly extending annular flanges on an end of said bearing cup, defining an annular groove means therebetween; said inner and outer cup flanges being spaced an amount greater than the inner and outer axial surfaces of said washer to provide axial clearance for said washer.

3. The bearing assembly of claim 2, wherein the washer is constructed totally of plastic and comprises inherent resiliently deformable means for facilitating insertion past an annular cup flange into said annular groove; said annular lip portion of said plastic washer being sufficiently rigid to provide roller retention.

4. In the bearing assembly of claim 2, further including an annular channel in said inner washer surface, being positioned radially outwardly of said lip means, and defining clearance means for said roller trunnions.

5. In the bearing assembly of claim 2, including rollers confined between said inner cup flange at each end of the cup, wherein said washer has an inner diameter substantially equal to the interior diameter described by said rollers circumferentially arranged in rolling engagement with the bearing race and defines a bearing end seal with said bearing cup and an associated shaft, for retaining a lubricant therein.

6. The bearing assembly of claim 5, wherein a radial innermost portion of said washer is in press-fit engagement with said shaft and the outer radial washer flange is in sliding-fit engagement in said cup groove.

7. In the bearing assembly of claim 2, further including slots extending entirely through said washer between axial inner and outer surfaces thereof.

8. The bearing assembly of claim 7, wherein said slots are arcuate.

9. The bearing assembly of claim 4, further including slots extending entirely through said washer between axial inner and outer surfaces thereof, said slots being arcuate, and wherein each of said arcuate slots terminates adjacent the inner surface of said washer in substantial axial alignment and communication with said annular channel.

10. The bearing assembly of claim 7, including rollers confined between said inner cup flanges at each end of the cup wherein said washer has an inner diameter substantially greater than the interior diameter described by said rollers circumferentially arranged in rolling engagement with the bearing race.

11. The bearing assembly of claim 2, wherein said means facilitating insertion comprises a frusto-conical radial outermost surface; said axial outer cup flange having a complementally configured inner radial surface.

12. A retaining washer comprising a resiliently deformable plastic annulus having a radially outwardly extending annular flange, an axially extending annular lip comprising a radial innermost portion which protrudes axially beyond an adjacent flange surface and an annular channel which is disposed radially outwardly of said lip and extends into said annulus in a direction opposite to the axial extension of said lip and beyond the plane of the surface of said flange on the side of the washer including said lip.

(References on following page)

References Cited

UNITED STATES PATENTS

| | | | |
|---|---|---|---|
| 1,270,820 | 7/1918 | Hart | 308—213 |
| 2,818,313 | 8/1955 | Gales | 308—212 |
| 3,113,813 | 12/1963 | Lobeck. | |
| 2,863,701 | 12/1958 | Jones et al. | |

FOREIGN PATENTS

| | | |
|---|---|---|
| 611,438 | 10/1948 | Great Britain. |
| 899,734 | 6/1962 | Great Britain. |

MARTIN P. SCHWADRON, *Primary Examiner.*

FRANK SUSKO, *Assistant Examiner.*